(12) United States Patent
Fuerlinger et al.

(10) Patent No.: US 9,314,868 B2
(45) Date of Patent: Apr. 19, 2016

(54) WIRE INLET NOZZLE

(75) Inventors: Johannes Fuerlinger, Sipbachzell (AT);
Klaus Oberndorfer, Vorchdorf (AT);
Stefan Platzer, Pettenbach (AT)

(73) Assignee: Fronius International GmbH,
Pettenbach (AT)

( * ) Notice: Subject to any disclaimer, the term of this patent is extended or adjusted under 35 U.S.C. 154(b) by 360 days.

(21) Appl. No.: 13/978,760

(22) PCT Filed: Mar. 28, 2012

(86) PCT No.: PCT/AT2012/000081
§ 371 (c)(1),
(2), (4) Date: Jul. 9, 2013

(87) PCT Pub. No.: WO2012/139144
PCT Pub. Date: Oct. 18, 2012

(65) Prior Publication Data
US 2013/0299478 A1    Nov. 14, 2013

(30) Foreign Application Priority Data
Apr. 12, 2011    (AT) .................................. A 519/2011

(51) Int. Cl.
*B23K 9/28*    (2006.01)
*B23K 9/32*    (2006.01)

(52) U.S. Cl.
CPC .. *B23K 9/28* (2013.01); *B23K 9/323* (2013.01)

(58) Field of Classification Search
CPC ............ B23K 9/123; B23K 9/28; B23K 9/32; B23K 9/122; B23K 9/295; B23K 9/325
USPC ............................ 219/137.42, 137.61, 137.63
See application file for complete search history.

(56) References Cited

U.S. PATENT DOCUMENTS 4,553,013 A    11/1985    Colman

FOREIGN PATENT DOCUMENTS

DE    26 17 072 A1    11/1977
GB    1 513 907 A    6/1978

OTHER PUBLICATIONS

International Search Report of PCT/AT2012/000081, mailed Jul. 20, 2012.
Austrian Office Action dated Jul. 7, 2011 in Austrian Application No. A 519/2011 with English translation of the relevant parts.

*Primary Examiner* — Brian Jennison
(74) *Attorney, Agent, or Firm* — Collard & Roe, P.C.

(57) ABSTRACT

The invention relates to a wire inlet nozzle (27) for fastening in a coupling (29) of a hose package (21), comprising a wire inlet element (32) and a fastening means (31) for a wire core (26) for guiding a welding wire (9), wherein a main body is formed between the wire inlet element (32) and the fastening means (31) and a cavity (56) is formed in the wire inlet element (32), in which cavity at least one sealing element (57) having an axial opening (59) for guiding the welding wire (9) is arranged. In order to prevent an escape of the protective gas in the wire inlet nozzle (27) in a direction opposite to the main conveying direction of the welding wire (9), the main body forms a first part (54) of the wire inlet element (32), and a second part (55) of the wire inlet element (32) can be detachably connected to the first part (54), and the main body is designed as a separating plane for independently fastening the wire core (26) and the sealing element (57).

7 Claims, 7 Drawing Sheets

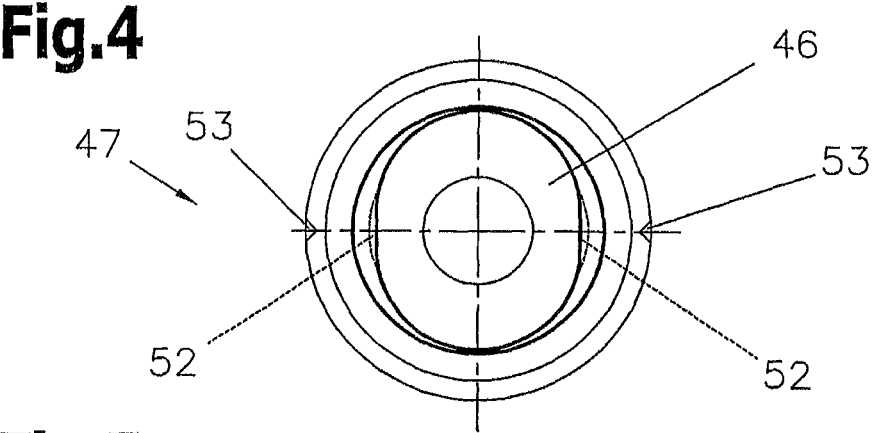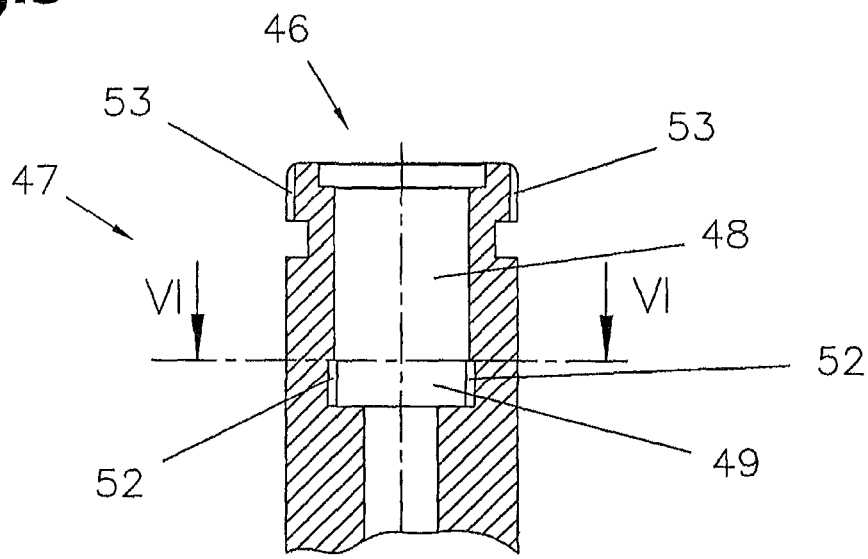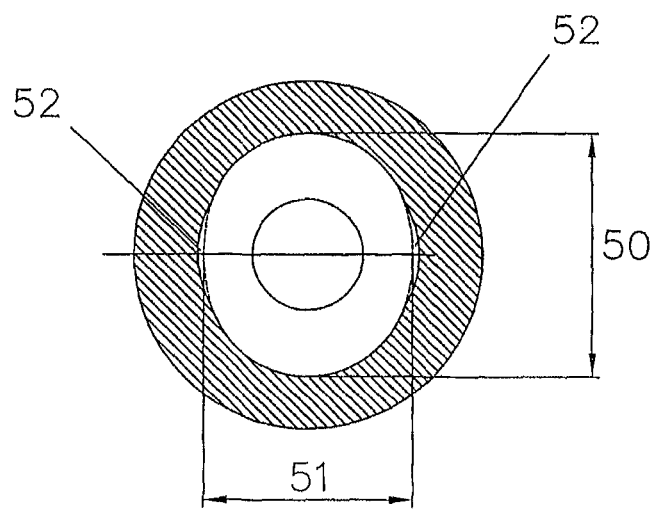

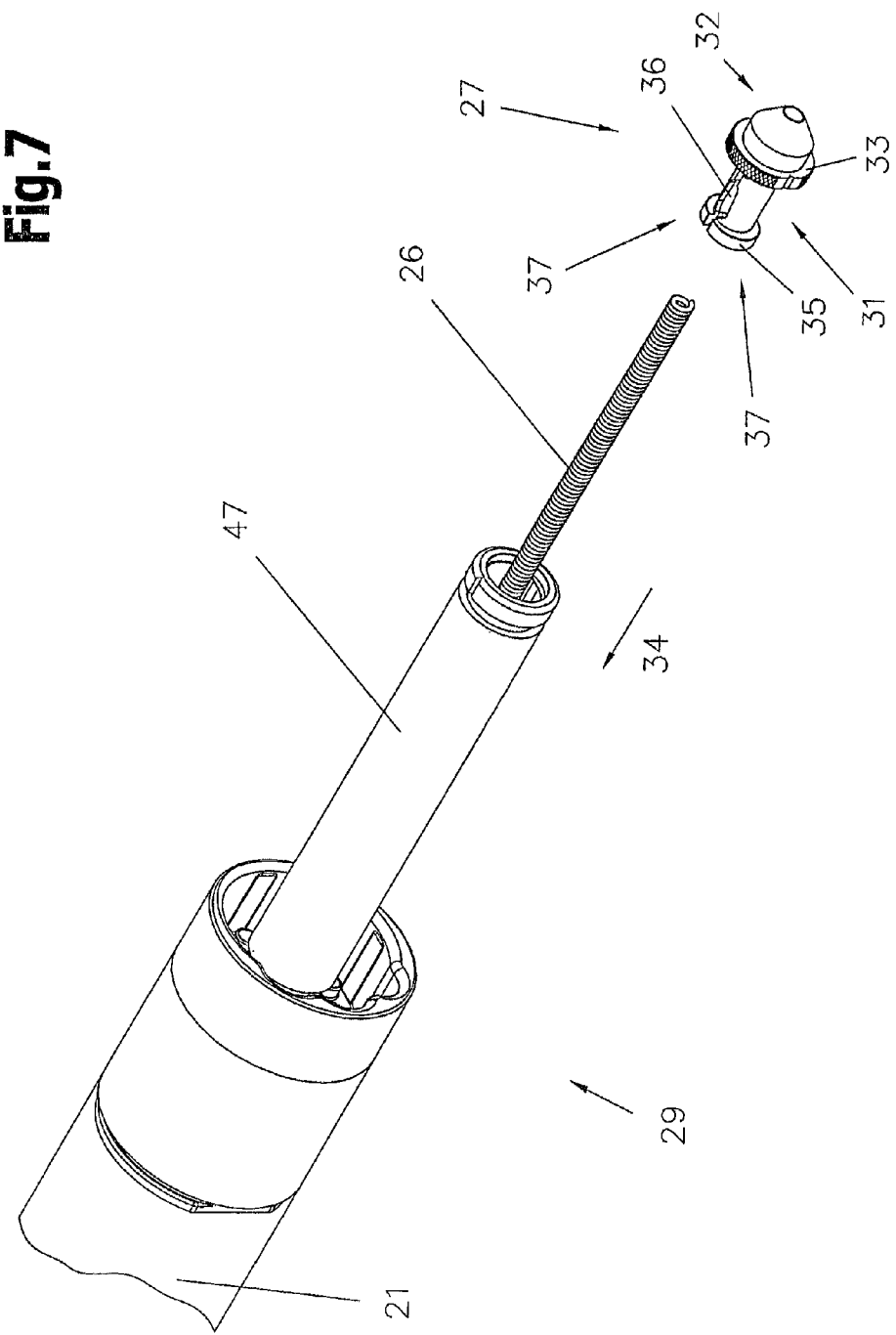

WIRE INLET NOZZLE

CROSS REFERENCE TO RELATED APPLICATIONS

Figure 1:
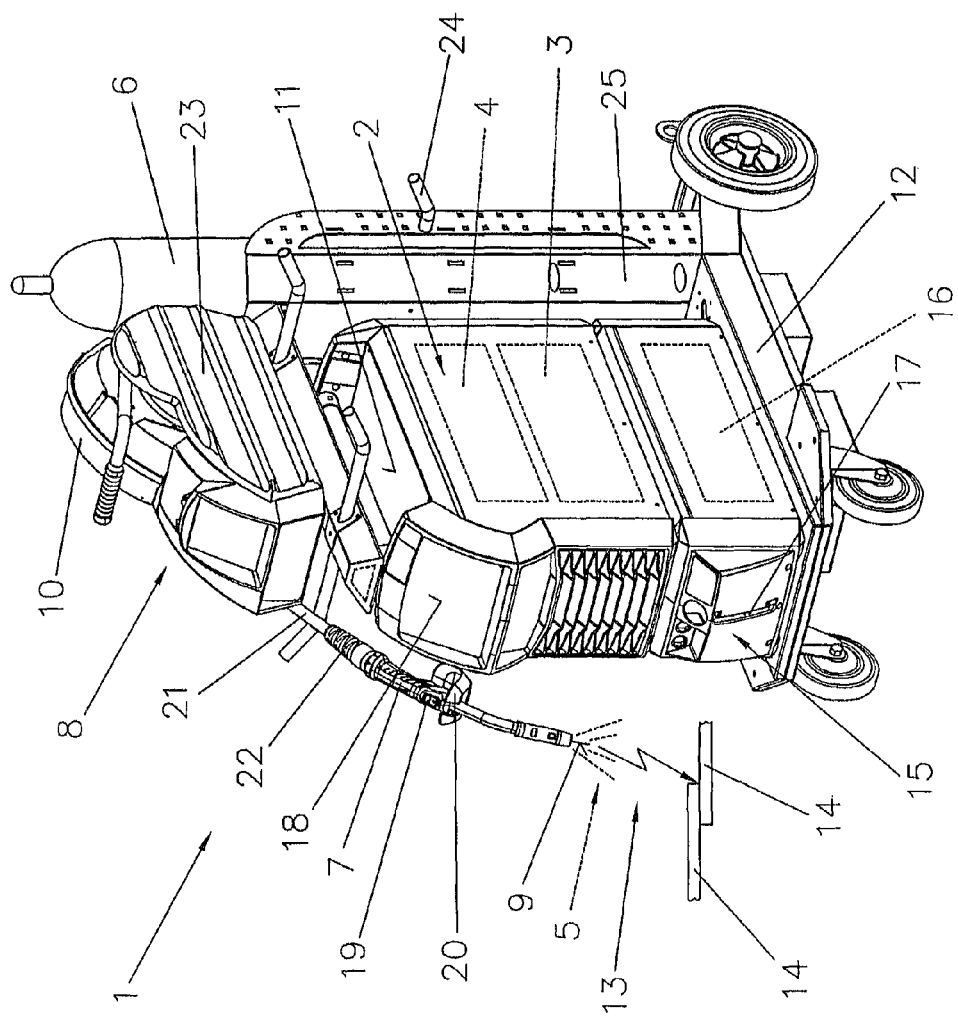

This application is the National Stage of PCT/AT2012/000081 filed on Mar. 28, 2012, which claims priority under 35 U.S.C. §119 of Austrian Application No. A 519/2011 filed on Apr. 12, 2011, the disclosures of which are incorporated by reference. The international application under PCT article 21(2) was not published in English.

The invention relates to a wire inlet nozzle for fastening in a coupling of a hose package, comprising a wire inlet element and a fastening means for a wire core for guiding a welding wire, wherein a main body is formed between the wire inlet element and the fastening means and a cavity is formed in the wire inlet element, in which cavity at least one sealing element having an axial opening for guiding the welding wire is arranged.

In general a wire inlet nozzle is used to introduce a welding wire into a hose package connected to a welding torch. Furthermore, a protective gas, a welding current, control lines and coolants are passed to the welding torch through the hose package. In order to obtain the required quality of the welding seam, the protective gas has to surround the welding wire at the welding site at the latest. In many cases the protective gas is supplied to a wire core, in which the welding wire is positioned, in the region of the wire inlet nozzle already. The protective gas is supplied under a given pressure, so the required amount per unit of time can be reached. Accordingly, the protective gas should flow exclusively towards the welding torch. In practice, however, there is substantially no way to prevent the protective gas from escaping also from the wire inlet nozzle and to prevent part of the protective gas from flowing in the wrong direction.

A wire inlet nozzle of the relevant type has been disclosed in DE 26 170 72 A1, for example.

It is the object of the invention to prevent an escape of the protective gas in the wire inlet nozzle in a direction opposite to the main conveying direction of the welding wire.

The object of the invention is achieved by a wire inlet nozzle as mentioned above, wherein the main body forms a first part of the wire inlet element, and a second part of the wire inlet element can be detachably connected to the first part, and the main body is designed as a separating plane for independently fastening the wire core and the sealing element. Since the sealing element is arranged upstream of the wire core, which is fastened via the fastening means, a sealed inlet of the welding wire is guaranteed. This prevents the protective gas from escaping from the fastening means into the wire inlet element in an advantageous manner. Here, the tightness of the wire inlet nozzle is independent from the wire core used, so wire cores without insulation may also be used as piece goods. By the same token, the consumption of protective gas is reduced and ambient air cannot mix with the gas, thus reducing outside effects on the welding result. Since the main body is designed as a separating plane, an independent fastening of the sealing element and the wire core may be achieved, and the tightness is increased because the transition from the sealing element to the wire core is across substantially planar surfaces in the separating plane.

In order to obtain an appropriate tightness, the diameter of the opening of the sealing element is substantially equal to the diameter of the welding wire.

Advantageously, the cavity of the wire inlet element is split between the first part and the second part. This makes it possible to integrate the sealing element into the wire inlet nozzle in a space-saving manner without altering the exterior shape thereof.

If the welding wire is led in the centre of the cavity and the diameter of the cavity is larger than the outside diameter of the sealing element, thus leaving free space between the sealing element and the cavity, the sealing element is kept within the cavity in a movable and/or floating manner. This makes it possible to compensate vibrations of the welding wire without causing increased wear of the sealing element. In this way, the lifetime of the sealing element is extended and the tightness is maintained over its lifetime.

Advantageously, a compensating element is arranged within the free space between the sealing element and the cavity. This keeps the sealing element in a substantially central position within the cavity, enabling an unlimited compensation of the vibrations of the welding wire.

At least one axial groove may be arranged in the axial opening of the sealing element, so an ideal tightness can be obtained in the axial opening while minimising friction of the welding wire at the same time. This means that the at least one groove reduces the friction surface of the welding wire in the axial opening while creating space for debris and sealing the welding wire at the same time. Thereby, the tightness is substantially independent from the conveying speed and/or the power of the conveying motor.

The sealing element is preferably made of a resilient plastic, in particular PAIs (polyamide-imides) or PET (polyethylene terephthalate).

The compensating element is preferably made of a plastic more resilient than that of the sealing element, in particular a resilient foam such as foam rubber.

By arranging a sealing ring in the region of the separating plane in the direction of the fastening element, a tight fastening of the wire inlet nozzle may be achieved, so no protective gas can escape in a direction opposite to the conveying direction of the welding wire.

Figure 2:
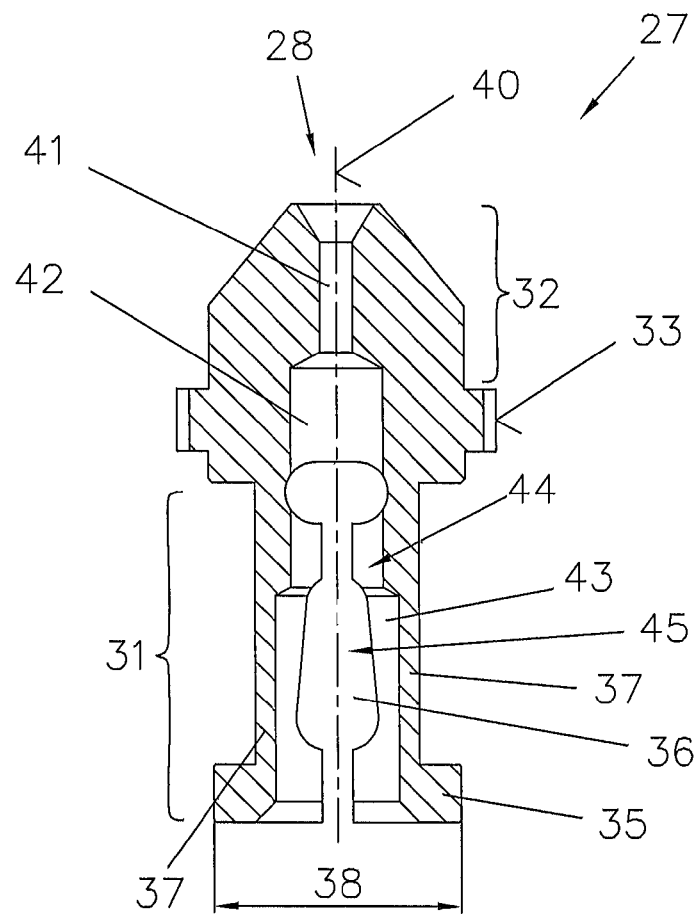
Figure 3:
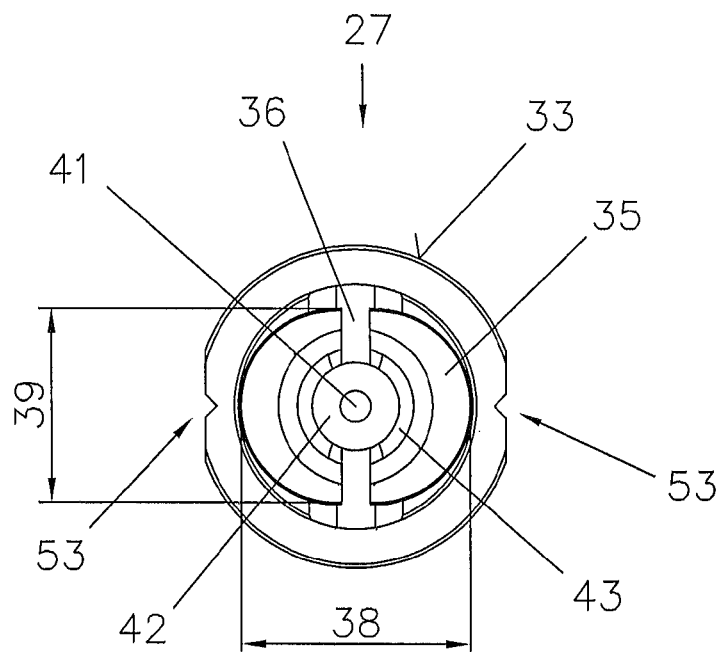
Figure 8:
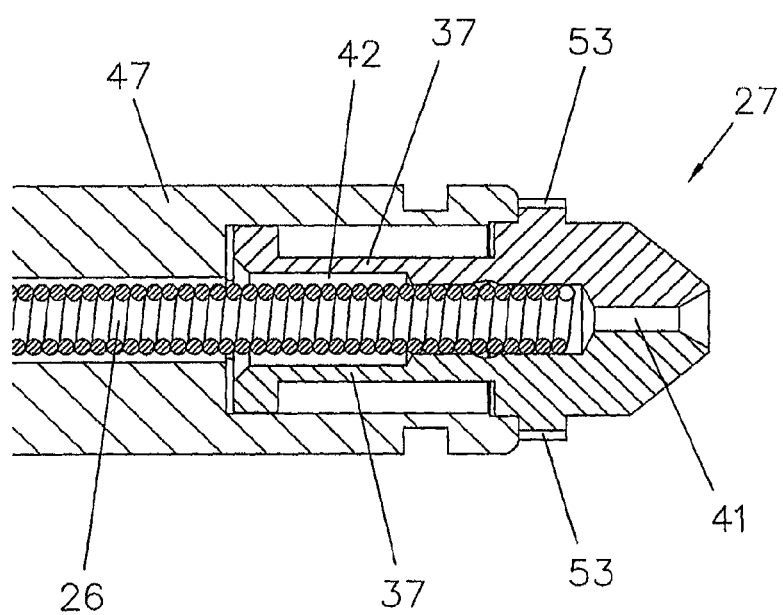
Figure 9:
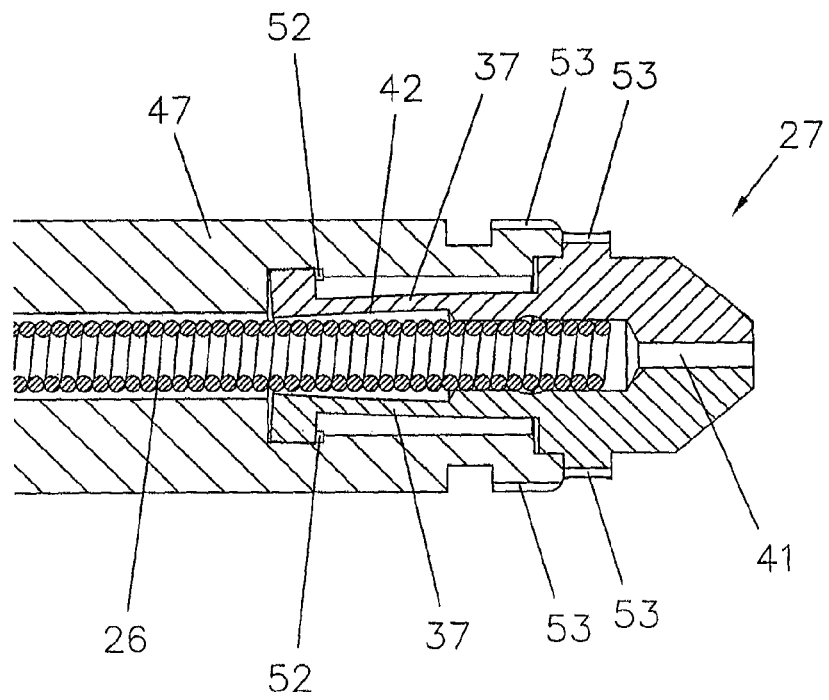
Figure 10:
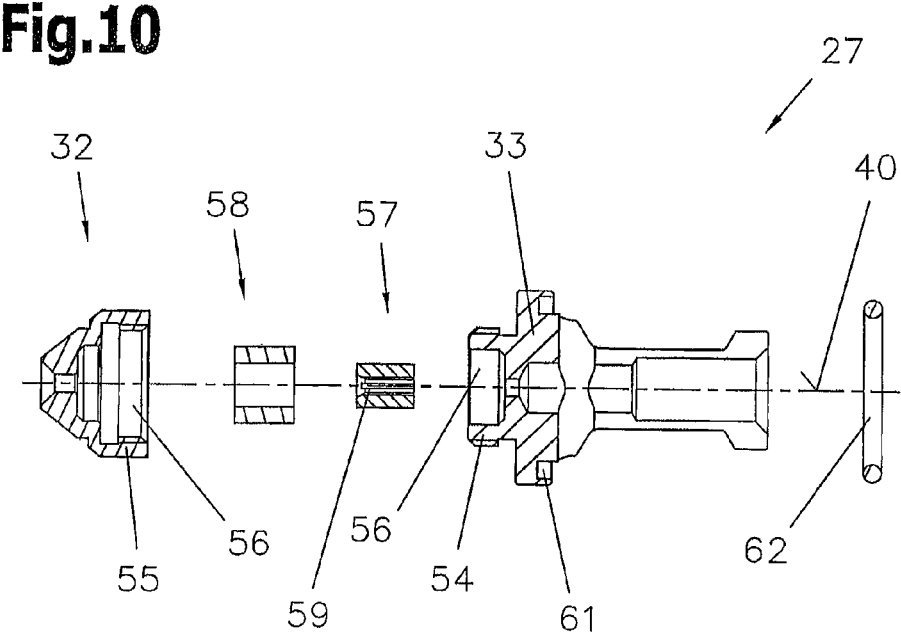
Figure 11:
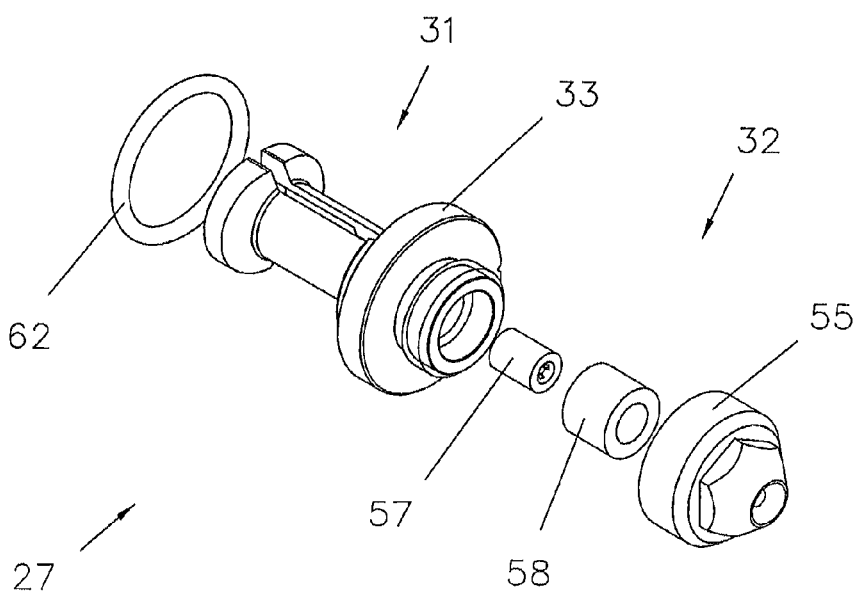
Figure 12:
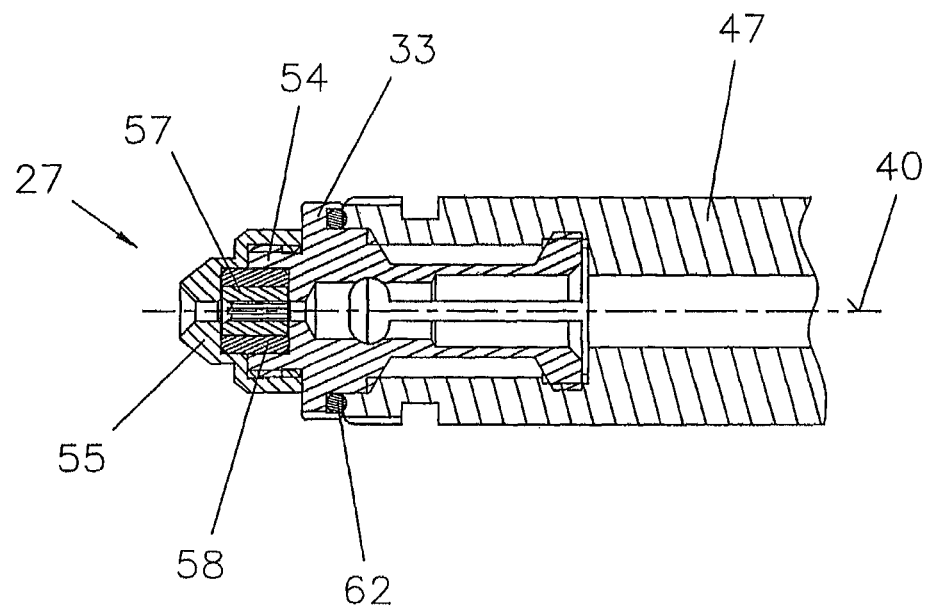
Figure 13:
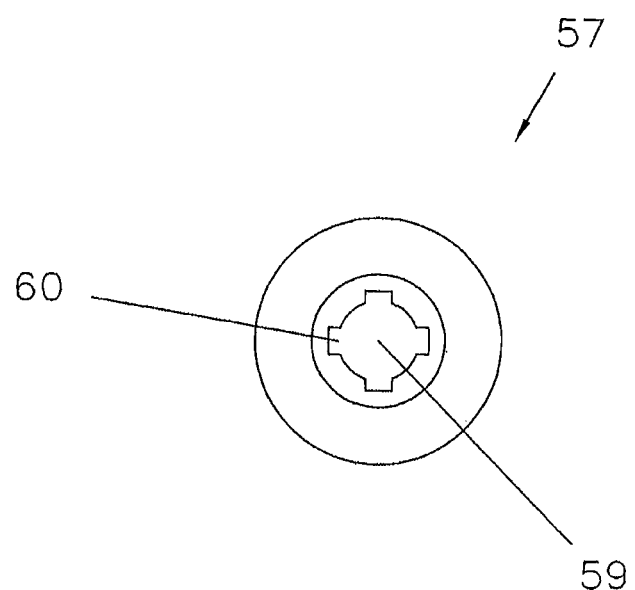

The present invention will be explained in more detail by means of the attached schematic drawings. In the drawings:

FIG. 1 is a schematic representation of a welding device;
FIG. 2 is a schematic sectional view of a wire inlet nozzle;
FIG. 3 is a schematic plan view of the wire inlet nozzle;
FIG. 4 is a schematic plan view of a current mandrel of a coupling;
FIG. 5 is a schematic sectional view of the current mandrel according to FIG. 4;
FIG. 6 is a schematic sectional view of the current mandrel according to FIG. 5 along section line VI-VI;
FIG. 7 is a schematic exploded view of a fastening system;
FIG. 8 is a schematic sectional view of the fastening system according to FIG. 7 in an assembled state;
FIG. 9 is a schematic sectional view of the fastening system in an assembled, twisted and fixed state;
FIG. 10 is a schematic sectional view of a wire inlet nozzle according to the invention in a disassembled state;
FIG. 11 is a schematic exploded view of the wire inlet nozzle according to FIG. 10;
FIG. 12 is a schematic sectional view of the wire inlet nozzle according to the invention and according to FIG. 10, installed within the current mandrel; and
FIG. 13 is a schematic front view of a sealing element according to the invention.

As an introduction, it is noted that like parts of the exemplary embodiment are designated by like reference numerals. All disclosures made in the description can be transferred to correspond to like parts with like reference numerals. Furthermore, single features from the exemplary embodiments shown may also represent discrete solutions according to the invention.

FIG. 1 shows a welding device 1 and/or a welding system for many different processes and/or methods such as MIG/MAG, TIG, electrode, double-wire/tandem welding operations, plasma operations or brazing and soldering operations etc.

The welding device 1 comprises a power source 2 with a power element 3 arranged therein, a control unit 4 and further components and wires (not shown) such as a switching member, control valves etc. The control unit 4 may be connected to a control valve that is arranged between a gas storage 6 and a (welding) torch 7 in a supply line for a gas 5, in particular a protective gas such as $CO_2$, helium or argon and the like.

In addition, the control unit 4 may be used to control also a wire feeding device 8 as it is common for MIG/MAG welding, with an additional material and/or welding wire 9 being supplied to the region of the welding torch 7 from a supply roll 10 and/or a wire coil via a supply line. Of course it is possible for the wire feeding device 8 to be integrated into the welding device 1, in particular into the housing 11 of the power source 2, as known from the prior art, in contrast to being an additional device positioned on a cart 12, as illustrated in FIG. 1. It is also possible for the wire feeding device 8 to be placed directly on top of the welding device 1, wherein the housing 11 of the power source 2 is formed for receiving the wire feeding device 8 on the top surface so that the cart 12 can be omitted.

It is further possible for the wire feeding device 8 to supply the welding wire 9 and/or the additional material outside of the welding torch 7 to the process site, in which case a non-melting electrode is preferably arranged within the welding torch 7, as is common in TIG welding.

The current for creating an electric arc 13, in particular a working arc, between the electrode and/or the welding wire 9 and a workpiece 14, which is formed by one or multiple parts, is supplied by the power element 3 of the power source 2 to the welding torch 7, in particular to the electrode and/or the welding wire 9, via a welding line (not shown). The workpiece 14 to be welded is connected to the power source 2 via a further welding line (not shown) for the further potential, in particular an earth cable, so that an electric circuit for a process can be created by means of the arc 13 and/or a plasma beam that has been created. When using a torch with an internal arc 13 ((not shown) as may be the case with plasma torches), both welding lines are led to the torch in order to form an appropriate electric circuit within the torch (not shown).

For cooling the welding torch 7, it may be connected to a liquid tank, in particular a water tank 16 with a level indicator 17, via a cooling device 15 and possible intermediate components such as a flow controller. On start-up of the welding torch 7, the cooling device 15, in particular a liquid pump used for the liquid placed in the water tank 16, is started, thus cooling the welding torch 7. As is shown in the exemplary embodiment given, the cooling device 15 is positioned on the cart 12 before placing the power source 2 thereon. The individual components of the welding installation, i. e. the power source 2, the wire feeding device 8 and the cooling device 15, are formed in such a way that they have corresponding protrusions and/or recesses so they can be stacked or placed on top of each other safely.

The welding device 1, the power source 2 in particular, further comprises an input and/or output device 18 for setting and/or retrieving and displaying all the various welding parameters, operation modes or welding programmes of the welding device 1. The welding parameters, operation modes or welding programmes that have been set by the input and/or output device 18 are communicated to the control unit 4, which then actuates the individual components of the welding device 1 and/or defines appropriate set points for regulating or controlling. It is also possible to perform setting procedures via the welding torch 7 when using an appropriate welding torch 7, in which case the welding torch 7 is equipped with a welding torch input and/or output device 19. In this case, the welding torch 7 is preferably connected to the welding device 1, in particular the power source 2 or the wire feeding device 8, via a data bus, in particular a serial data bus. For starting the welding process, the welding torch 7 usually comprises a starting switch (not shown), so the arc 13 can be ignited by actuating the starting switch. In order to protect the user from the heat radiation of the arc 13, the welding torch 7 may be equipped with a heat protection shield 20.

In the exemplary embodiment shown, the welding torch 7 is connected to the welding device 1 via a hose package 21, said hose package 21 being attached to the welding torch 7 by an anti-buckling means 22. In the hose package 21, the individual lines such as the supply line, lines for the welding wire 9, for the gas 5, for the cooling circuit, for data transmission etc. are arranged from the welding device 1 to the welding torch 7 while the earth cable is preferably connected to the power source 2 separately. Preferably, the hose package 21 is connected to the power source 2 or the wire feeding device 8 by means of a coupling device not shown, whereas the individual lines in the hose package 21 are attached to or in the welding torch 7 by an anti-buckling means. In order to guarantee an appropriate strain relief for the hose package 21, the hose package 21 may be connected to the housing 11 of the power source 2 or the wire feeding device 8 via a strain relief device (not shown).

In general, not all components mentioned above have to be used and/or incorporated for the different welding operations and/or welding devices 1, such as TIG devices or MIG/MAG devices or plasma devices. It may be possible for the welding torch 7 to be formed as an air-cooled welding torch 7 so the cooling device 15 can be omitted. The welding device 1 is formed by at least the power source 2, the wire feeding device 8 and the cooling device 15, if required, which components may all be arranged in a common housing 11. It is possible to arrange further parts and/or components such as a drag protection 23 on the wire feeding device 8 or a carrier 24 for optional equipment on a holder 25 for the gas storage 6 etc.

Moreover, it is known that the welding wire 9 is led to the welding torch 7 in a wire core 26 or a welding wire core 26 in the hose package 21. The transition of the welding wire 9 from the feed unit of the wire feeding device 8 into the wire core 26 is accomplished via a wire inlet nozzle 27, which substantially comprises a through opening 28 for the welding wire 9 in its centre. Preferably the wire inlet nozzle 27 will be screwed into a coupling 29 of the hose package 21, thereby fixing the wire core 26 at the same time. Before using this fixing method, however, a fastening piece has to be fitted onto the wire core 26, for example by pressing. This fastening piece enlarges the diameter of the wire core 26 accordingly, so it can no longer be displaced and remains fixed.

According to the invention, a fastening without a fastening piece is provided, so the wire core 26 can be fastened without the use of tools, with the wire core 26 being inserted into the wire inlet nozzle 27 and the wire core 26 being locked and fixed within the wire inlet nozzle 27 together with the fastening of the wire inlet nozzle 27 at the same time.

This is described in detail by means of FIGS. 2 to 9 below.

For the simultaneous fastening of the wire core 26 and the wire inlet nozzle 27, the wire inlet nozzle 27 is specifically designed as part of the fastening system. In particular, one section of the wire inlet nozzle 27 is designed as a fastening means 31, with the section of the wire inlet element 32 and the section of the stopper 33 being designed to complement it. Both the wire inlet element 32 and the stopper 33 are known per se. Seen in the conveying direction 34 or the main conveying direction of the welding wire 9, the wire inlet element 32 is the first section, the stopper 33 is the second section, and the fastening means 31 is the third section.

The fastening means 31 is formed having the shape of a cylinder, with an oval (or elliptical) web 35 being arranged at the end located opposite the wire inlet element 32. Furthermore, the fastening means 31 is divided into two parts by at least one slot 36. In the case of a single slot 36, two jaws 37 are created, giving the fastening means 31 a certain degree of deformability. The slot 36 extends across the web 35 as well, parting it into two halves in the same manner. The fastening means 31 is cut through at its centre, so to speak, in order two form the two movable jaws 37.

The length of the major axis 38 of the oval web 35 is larger than the diameter of the cylindrically shaped part of the fastening means 31. Preferably, however, the length of the minor axis 39 is also larger than the diameter of the cylindrically shaped part. As a consequence, the oval web 35 protrudes over the cylindrically shaped part of the fastening means 31. The length of the major axis 38 of the oval web 35 is smaller than the diameter of the stopper 33 of the wire inlet nozzle 27, so the fastening means 31 may be received by the coupling 29 of the hose package 21 up to the stopper 33. In its assembled state, the fastening means 31 is not visible because it is arranged inside the coupling 29.

Three concentric bores are arranged around the central axis 40 of the wire inlet nozzle 27, with the first bore 41 being arranged within the wire inlet element 32 and matching the diameter of the welding wire 9, the second bore 42 matching the diameter of the wire core 26, and the third bore 43 being designed larger than the diameter of the wire core 26. The third bore 43 is arranged in the region of the fastening means 31 and the second bore 42 is arranged in the region of the stopper 33. The second bore 42 provides a pressing region 44 for the wire core 26. The area of the fastening means 31 around the third bore 43 is formed as a cushioning region 45. The pressing region 44 is formed substantially in the transition area between the third bore 43 and the second bore 42, i. e. at the end of the cushioning region 45, so both the pressing region 44 and the cushioning region 45 are arranged within the fastening element 31. The slot 36 is designed to be larger upstream and downstream of the pressing region 44, so a defined pressing region 44 is being formed. The wire core 26 is thus locked and fixed within this pressing region 44 by a narrowing of the pressing region 44. The force for locking the wire core 26 within the pressing region 44 is determined via the length of the cushioning region 45 according to the law of the lever. As the oval web 35 is arranged at the beginning of the cushioning region 45 and formed to protrude with respect to the cylindrically shaped region, the jaws 37 are pushed together accordingly over this oval web 35. The locking of the wire core 26 within the pressing region 44 may thus be effected by a low force being applied to the beginning of the cushioning region 45. In addition, the force may also be affected by the design of the slots 36—such as the enlargement upstream and downstream of the pressing region 44—since this has an effect on the amount of material to be moved.

To fasten the wire core 26, it is led through the third bore 43 of the wire inlet nozzle 27 and inserted into the second bore 42. Then the fastening means 31, including the wire core 26 inside, may be introduced into a recess 46 of the coupling 29 of the hose package 21 as a further part of the fastening system. As a consequence, the wire core 26 is in the pressing region 44 of the wire inlet nozzle 27 which it is not yet narrowed, so the wire core 26 is not yet locked within. The recess 46 may be arranged on the front and in the centre of a current mandrel 47 of the coupling 29, for example, so the wire core 26 may be positioned in the centre of the current mandrel 47. The recess 46 is formed in a first part section 48, having an oval design corresponding to the oval web 35. Accordingly, the first part section 48 of the recess 46 has a major axis and a minor axis as well, corresponding substantially to the major axis 38 and the minor axis 39 of the oval web 35. This makes it possible to define the position for introducing the fastening means 31 up to the stopper 33. The first part section 48 of the recess 46 has a length and/or depth which is substantially equal to the cylindrical region of the fastening means 31 and/or the length between the stopper 33 and the oval web 35. Adjoining the oval part section 48, a second part section 49 of the recess 46 is shaped almost circular, corresponding to the height of the oval web 35. Accordingly, the wire inlet nozzle 27 may be twisted once the stopper 33 abuts against the current mandrel 47. Advantageously, the front face of the stopper 33 has a ribbed or corrugated design so the user or welder can twist the wire inlet nozzle 27 with his fingers and without tools, so the wire core 26 and the wire inlet nozzle 27 can be fixed. The stopper 33 is thus formed as a fixing element for the wire inlet nozzle 27.

This means that twisting the wire inlet nozzle 27 is only possible when the oval web 35 is located below the oval part section 48 of the recess 46. In order to press the jaws 37 together during twisting, the second part section 49 is designed in an appropriate oval or elliptical fashion, with the difference between the length of the major axis 50 and the length of the minor axis 51 being just minimal. Thus, the design of the second part section 49 is almost circular. The length of the major axis of the first part section 48 is equal to the length of the major axis 50. When the wire inlet nozzle 27 is twisted, the major axis 38 of the oval web 35 is turned onto the minor axis 51 in the second part section 49 of the recess 46, and the jaws 37 are pressed together close enough to cover the difference in length between the major axis 50 and the minor axis 51, thus narrowing the pressing region 44 sufficiently to lock the wire core 26.

The fixing of the wire inlet nozzle 27 is effected by twisting the oval web 35, which is designed elevated with respect to the cylindrical region of the fastening means 31, at least partially to the back of the oval part section 48 of the recess 46 in the region of the major axis 50, i. e. flush with the minor axis 51 of the oval part section 48 of the recess 46. This is because the second part section 49 of the recess 46 is almost circular. Accordingly, the length of the oval part section 48 of the recess 46 flush with the minor axis 51 is larger than the length of the minor axis 51. The oval web 35 may be twisted to the back of the oval part section 48 of the recess 46, and the wire inlet nozzle 27 cannot be pulled out of the current mandrel 47.

Flush with the minor axis 51 of the oval region of the recess 46, the almost circular part section 49 of the recess 46 is provided with indentations 52 in order to slightly loosen the locking of the wire core 26 and slightly drive the jaws 37 apart from one another. This makes the user feel a latching and also secures the fixing of the wire inlet nozzle 27 since the jaws 37 need to pressed together slightly before twisting the wire inlet nozzle 27, so a certain application of force is required. Thereby, an unintended twisting is substantially impossible.

Preferably, the compressed state and/or the fixed wire core 26 may be indicated by at least two opposite notches 53 in the front of the stopper 33 and in the current mandrel 47. When the notches 53 in the stopper and in the current mandrel 47 are flush, the wire core 26 is fixed. The flush notches 53 are used to indicate a proper fixing to the user. The notches 53 are thus located on the front along the major axis 38 of the oval web 35 of the wire inlet nozzle 27 and on the minor axis 51 of the second part section 49 of the recess 46 of the current mandrel 47 (see FIGS. 3 and 4). The notches 53 on the wire inlet nozzle 27 are thus arranged normal to the slot 36 and the notches 53 on the current mandrel 47 are arranged flush with the slot 36 as long as the wire inlet nozzle 27 has not been twisted.

Since the second part section 49 of the recess 46 of the current mandrel 47 is shaped almost circularly, the wire core 26 may be fixed by twisting in any direction. Basically, the wire core 26 is fixed or released by a quarter twist of the wire inlet nozzle 27.

The fastening means 31 may comprise grooves, a thread or the like in the opening for receiving the wire core 26, thereby improving the locking of the wire core 26. Preferably, such a modification is applied when working with wire cores 26 made of softer materials.

The wire core 26 and the wire inlet nozzle 27 may thus be fastened at the same time, without the use of tools and in a swift manner while no additional elements need to be attached to the wire core 26. As a consequence, it is easily possible to use continuous wire cores that are being cut to appropriate lengths. Since no additional elements are attached to the side of the wire core, the wire core 26 may be installed from any side, so preferably it is pushed through the hose package 21 from any side. Also, the wire core 26 is substantially not twisted during fixation. Another advantage of the fastening system is its independence from the material (steel, plastic, etc.) of the wire core 26.

According to the invention it is provided that the stopper 33 on the wire inlet nozzle 27 is designed as a rigid main body and forms a first part 54 of the wire inlet element 32, and a second part 55 of the wire inlet element 32 may be detachably connected to the first part 54. In the wire inlet element 32 a cavity 56 is formed, in which a sealing element 57 is arranged.

The invention is described in detail by means of FIGS. 10 to 13 below.

The cavity 56 may be split between the first part 54 and the second part 55 and preferably has the shape of a cylinder. Accordingly, the cavity 56 is arranged in the centre, i. e. it is arranged centrally around the central axis 40 of the wire inlet nozzle 27. The diameter of the cavity 56 is larger than the outside diameter of the cylindrically shaped sealing element 57, so a circular ring-shaped free space is created around the sealing element 57. The length of the sealing element 57 is designed to match the length of the cavity 56. Accordingly, the sealing element 57 is just slightly shorter than the cavity 56, so the sealing element 57 is movable within the cavity 56 radially as well as axially and thus adapts to a cast of the welding wire 9. For this, the sealing element 57 is made of a material such as PAIs (polyamide-imides), PET (polyethylene terephthalate) or other resilient plastics.

The movements of the sealing element 57 may be limited by a compensating element 58, which is arranged in the free space and surrounds the sealing element 57 accordingly. The compensating element 58 makes it possible to keep the sealing element 57 in a floating manner by the compensating element 58 absorbing radial movements of the sealing element 57 by being compressed. This will dampen the vibrations of the welding wire 9, which is conveyed by the sealing element 57, so uncompromised tightness can be maintained. A suitable material for the compensating element 58 is a resilient foam such as foam rubber.

Preferably the compensating element 58 and the sealing element 57 have the same length.

The fastening of the sealing element 57 and the compensating element 58 is done via the second part 55 of the wire inlet element 32 by attaching it to the first part 54 of the main body, for example by means of a screwing connection. Here, the screwing connection must be screwed accordingly up to a stopper 33—i. e. a front face of the main body—so the cavity 56 has a defined height and the sealing element 57 is movable within the cavity 56.

When the first part 54 is attached to the second part 55, the cavity split between parts 54, 55 is closed. For example, the sealing element 57 and the compensating element 58 may be inserted substantially halfway into the first part 54 and then the second part 55 is screwed onto the first part 54. Accordingly, the second halves of the sealing element 57 and the compensating element 58 are received by the second part 55.

Next, the wire inlet nozzle 27 may be fixed within the current mandrel 47, with the wire core 26 being fixed accordingly as well. This shows that the attachment of the sealing element 57 and the compensating element 58 is independent from the fastening of the wire core 26 since the attachment of the sealing element 57 and the compensating element 58 is done substantially in front of the main body, and the fastening of the wire core 26 is done substantially behind the main body. Thus, the rigid main body has the function of a separating plane.

In this state the welding wire 9 is introduced into the wire inlet nozzle 27, being led first through the sealing element 57, then through the main body, and next through the wire core 26. This corresponds to the main conveying direction of the welding wire 9 as well. In certain welding processes that include short circuits, such as the CMT (cold metal transfer) welding process, the welding wire 9 may also be conveyed backwards—i. e. in the direction opposite to the main conveying direction.

The protective gas 5 required for the welding process is supplied to the wire core 26 in the region of the fastening means 31 and/or downstream the region of the fastening means 31, wherein an escaping of the protective gas 5 towards the wire inlet element 32 is prevented by the solution according to the invention.

This is possible because an opening 59 of the sealing element 57 is designed to match the diameter of the welding wire 9, so it is continuously surrounded by the sealing element 57 while being conveyed.

To reduce friction in the opening 59 of the sealing element 57, at least one axial groove 60, preferably four grooves 60, are integrated into the sealing element 57. This at least one groove 60 has a width of 1 mm, for example. This reduces the friction surface for the welding wire 9 in the opening 59 and prevents the welding wire 9 from being stuck.

The wear debris created during the conveying of the welding wire 9 may be deposited in the grooves 60 of the sealing element 57, with the debris sealing accordingly. If required, the sealing element 57 may be replaced routinely, together with the wire core 26, to prevent the grooves 60 from being completely blocked by debris.

A further sealing may be implemented in the separating plane between wire inlet nozzle 27 and current mandrel 47, so this point of transition is designed in a sealed fashion as well. For this, the separating plane comprises a radial recess 61 on the side of the fastening means 31, designed to receive a sealing ring 62. When fastening the wire inlet nozzle 27, this sealing ring 62 is pressed against a front face of the current mandrel 47, so gas is prevented from escaping.

The invention claimed is:

1. A wire inlet nozzle for fastening in a coupling of a hose package, comprising a wire inlet element and a fastening means for a wire core for guiding a welding wire wherein a main body is formed between the wire inlet element and the fastening means and a cavity is formed in the wire inlet element, in which cavity at least one sealing element having an axial opening for guiding the welding wire is arranged, wherein the main body forms a first part of the wire inlet element, and a second part of the wire inlet element can be detachably connected to the first part, wherein the cavity in the wire inlet element is split between the first part and the second part, wherein the welding wire is led in the center of the cavity through the axial opening of the sealing element and the diameter of the cavity is larger than the outside diameter of the sealing element and the sealing element is designed shorter than the cavity, so a free space is created between the sealing element and the cavity, and the sealing element is movable radially as well as axially in the cavity, and the main body is designed as a separating plane for independently fastening a wire core and the sealing element.

2. The wire inlet nozzle according to claim 1, wherein the diameter of the axial opening is substantially equal to the diameter of the welding wire.

3. The wire inlet nozzle according to claim 1, wherein a cylindrical compensating element is arranged in the free space between the sealing element and the cavity.

4. The wire inlet nozzle according to claim 1, wherein at least one axial groove is arranged in the axial opening of the sealing element.

5. The wire inlet nozzle according to claim 1, wherein the sealing element is made of PAIs (polyamide-imides) or PET (polyethylene terephthalate).

6. The wire inlet nozzle according to claim 3, wherein the cylindrical compensating element is made of a resilient foam which is more resilient than the sealing element.

7. The wire inlet nozzle according to claim 1, wherein a sealing ring is arranged in the region of the separating plane in the direction of the fastening means.

* * * * *